(12) United States Patent
Teplitsky et al.

(10) Patent No.: US 9,514,035 B1
(45) Date of Patent: Dec. 6, 2016

(54) COVERAGE DRIVEN GENERATION OF CONSTRAINED RANDOM STIMULI

(71) Applicant: Cadence Design Systems, Inc., San Jose, CA (US)

(72) Inventors: Marat Teplitsky, Kfar-Sava (IL); Raz Azaria, Nahariya (IL); Amit Metodi, Ashkelon (IL); Yael Kinderman, Givat Shmuel (IL)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/582,328

(22) Filed: Dec. 24, 2014

(51) Int. Cl.
*G06F 17/50* (2006.01)
*G06F 11/36* (2006.01)

(52) U.S. Cl.
CPC .................. *G06F 11/3676* (2013.01)

(58) Field of Classification Search
USPC ........................................................ 716/106
See application file for complete search history.

(56) References Cited

U.S. PATENT DOCUMENTS

| | | | | |
|---|---|---|---|---|
| 8,904,321 | B1* | 12/2014 | Cohen | G06F 17/5009 716/106 |
| 2004/0243371 | A1* | 12/2004 | Gutkovich | G01R 31/318357 703/14 |
| 2004/0249618 | A1* | 12/2004 | Fine | G06F 11/261 703/2 |
| 2009/0037858 | A1* | 2/2009 | Thakur | G06F 17/5081 716/106 |
| 2012/0227021 | A1* | 9/2012 | Huilgol | G06F 17/5022 716/106 |
| 2013/0007680 | A1* | 1/2013 | Kadkade | G06F 17/5022 716/107 |
| 2014/0172347 | A1* | 6/2014 | Gavish | G06F 17/5081 702/123 |

* cited by examiner

*Primary Examiner* — Mohammed Alam
(74) *Attorney, Agent, or Firm* — Pearl Cohen Zedek Latzer Baratz LLP

(57) ABSTRACT

A method, system and computer readable medium for coverage driven generation of stimuli for DUT verification. The method may include receiving, via an input device, a generation model and a coverage model from a user. The method may also include using a processor, identifying a coverage item in the coverage model and finding a corresponding element in the generation model corresponding to the coverage item. The method may further include using a processor translating a coverage requirement associated with the coverage item into a distribution directive; and using a processor, solving the generation model with the distribution directive on the corresponding element, to obtain a set of stimuli.

17 Claims, 3 Drawing Sheets

COVERAGE DRIVEN GENERATION OF CONSTRAINED RANDOM STIMULI

FIELD OF THE INVENTION

The present disclosure relates to verification (e.g., in software testing). More specifically, the present invention relates to method and system for coverage driven generation of stimuli.

BACKGROUND OF THE INVENTION

In software testing, a considerable attention is given to coverage. Coverage refers to the extent of which all parts of the tested code have actually been subjected to testing by the test tool.

Functional verification tests a hardware device by simulating the functionality of a device-under-test (DUT). Verification is performed by stimulating the DUT with a wide variety of inputs (also referred to as—"stimuli") to ensure that all aspects of the DUT have been tested.

SUMMARY OF THE INVENTION

There is thus provided, according to some embodiments of the present invention, a method for coverage driven generation of stimuli for DUT verification. The method may include receiving, via an input device, a generation model and a coverage model from a user. The method may also include, using a processor, identifying a coverage item in the coverage model and finding a corresponding element in the generation model corresponding to the coverage item. The method may further include, using a processor translating a coverage requirement associated with the coverage item into a distribution directive; and, using a processor, solving the generation model with the distribution directive on the corresponding element, to obtain a set of stimuli.

In some embodiments of the present invention, the generation model may be a constraint model.

According to some embodiments of the present invention, the coverage model may be defined based on desired input values for the DUT.

In some embodiments of the invention, the coverage model may be defined based on anticipated output values from the DUT.

In some embodiments, the coverage item is a variable.

In some embodiments finding the corresponding element comprises identifying a field in the coverage model that relates to a field associated with the coverage item in a known relation.

According to some embodiments, finding the corresponding element comprises identifying a field in the coverage model that is same as a field associated with the coverage item.

In accordance with some embodiments of the present invention, there is also provided a non-transitory computer readable storage medium for coverage driven generation of stimuli for DUT verification, having stored thereon instructions that when executed by a processor will cause the processor to: receive, via an input device, a generation model and a coverage model from a user; identify a coverage item in the coverage model and find a corresponding element in the generation model corresponding to the coverage item; translate a coverage requirement associated with the coverage item into a distribution directive; and solve the generation model with the distribution directive on the corresponding element, to obtain a set of stimuli.

There is also provided, according to some embodiments of the present invention, a system for coverage driven generation of stimuli for DUT verification. The system may include a processor and a memory. The processor may be configured to: receive, via an input device, a generation model and a coverage model from a user; identify a coverage item in the coverage model and find a corresponding element in the generation model corresponding to the coverage item; translate a coverage requirement associated with the coverage item into a distribution directive; and solve the generation model with the distribution directive on the corresponding element, to obtain a set of stimuli.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF THE INVENTION

Figure 1A:
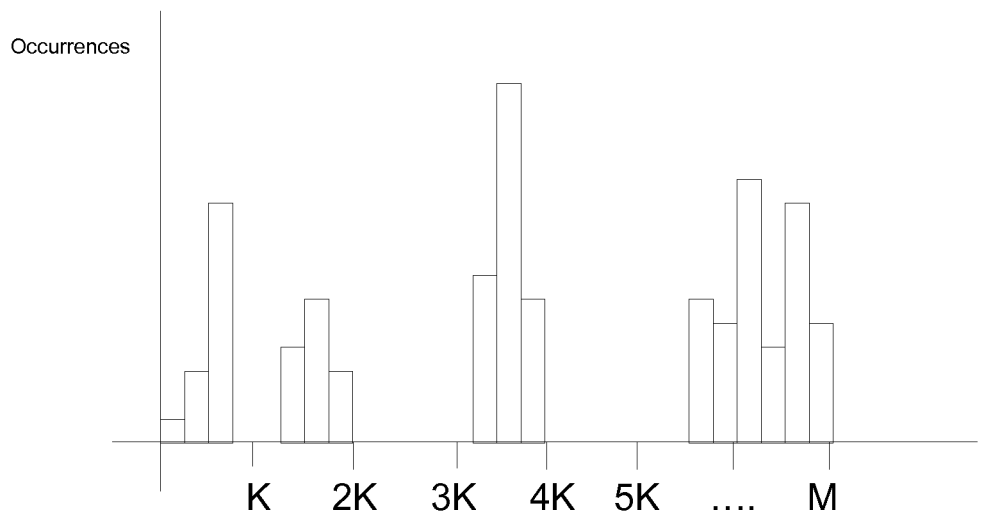
FIG. 1A illustrates a plot of a distribution of generated stimuli that were generated by a stimuli generator by solving a generation model for a particular DUT.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

As design complexity grew over the years, the convergence of the verification effort became a central challenge in hardware verification. To monitor, measure and manage the progress of verification, metric-driven-verification, and coverage models were developed. With an enormous amount of stimuli required to qualify a DUT, a constrained random approach became the heart and soul of verification. In this approach, the protocols and specifications that the stimuli must obey are modeled as constraints, and the verification engine provides random, but legal, scenarios to stimulate the DUT. One of the problems commonly reported by verification experts is that the random approach does not achieve coverage closure, because after a while the random stimulus is repeated and does not contribute any more to coverage closure, while many coverage holes and interesting scenarios remain uncovered. As a result, verification teams turn to the exhaustive running of simulations, or alternatively, to manually crafted directed tests.

However, one largely overlooked means for automatically improving coverage closure lies in the distribution of the random stimuli provided by the verification tools. A common paradigm asserts that it is the job of a verification engineer to direct the random stimuli generator towards the desired results, using distribution directives that are part of the verification languages.

Unfortunately, the practice of analyzing the constraint and coverage models, and improving their distribution by iteratively injecting distribution constructs, does not scale and leaves verification teams with no productive solutions to bring verification to closure.

While coverage closure is a grand goal of the metric driven verification methodology, stimuli generators are aimed at assisting users with this goal and providing them with a good random distribution mechanism, relying on "understanding" of the functional intent from the constraint language, and distributing accordingly.

However, at times, the constraints do not provide an accurate description of the intended coverage. It can happen when the coverage requires particular buckets to be filled, or when the coverage is defined on some fields while other fields are of no or little interest. In both cases, the constraint model and the generator are unaware of these aspects, and therefore do not provide a good coverage of the verification goals.

As the industry moves towards automated coverage closure, the traditional approaches of direct testing or exhaustive random simulations seem no longer sufficient and more automation seems to be required.

When testing a DUT the testing tool provides the DUT with stimuli (which are basically data items, also known as "inputs"), and examines the outputs to verify that the DUT is functioning properly.

When preparing for DUT verification, a user typically considers two models:

a) a generation model, which essentially is a set of definitions and constraints relating to the stimuli to be generated; and b) a coverage model, which includes coverage requirements and is aimed at making sure that the functionality of the tested DUT is properly covered. In some embodiments the coverage model may be defined based on inputs which are necessary and it is therefore required to "direct" the stimuli generator to generate such inputs. In some embodiments, the coverage model may be defined based on the expected outputs and their distribution, and may involve extracting from the expected outputs inputs that it is desired to obtain from the stimuli generator. In some embodiments, the coverage model may be defined based on expected events within the DUT (e.g., considering segments of the DUT).

A constraint solver may be used in the generation of stimuli, which constraint solver uses the generation model to interpret the functional intention of the test, and directs the randomization distribution towards these goals, generating constrained random stimuli. This is, however, an imperfect method, as the generation model and the coverage model are separate entities, and some coverage goals may not be represented by the generation model. In fact, sometimes, when the generated stimuli are examined, it is evident that the coverage model requirements are not fully met.

In FIG. 1A the distribution of a set of generated stimuli that were generated by a stimuli generator by solving a generation model for a particular DUT is presented. The plotted graph shows the occurrences of stimuli versus their values over a range of 0 to M.

Figure 1B:
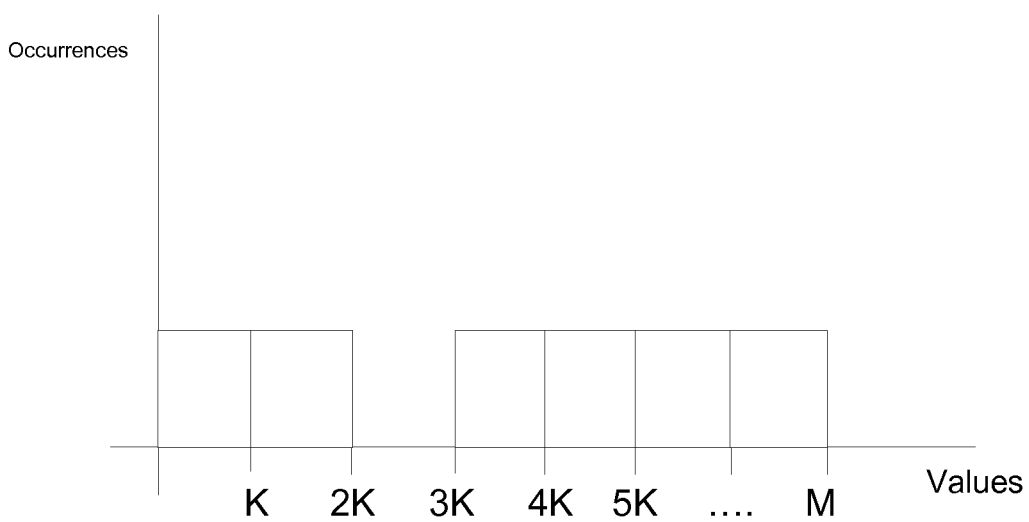
FIG. 1B illustrates a desired distribution of stimuli, according to a coverage model for the same DUT.

FIG. 1B illustrates a desired distribution of stimuli, according to a coverage model for the same DUT. The coverage model dictates the occurrence of stimuli in the value ranges 0-K, K-2K, 3K-4K, 4K-5K, up to M.

It is evident from FIG. 1A and FIG. 1B that the stimuli that were generated based on the generation model do not properly cover all desired ranges according to the coverage model, as some ranges are completely uncovered (hereinafter referred to as "coverage voids"). Furthermore, it is also evident that in some ranges there are occurrences of large numbers of stimuli of same value. This is not surprising given the random nature of stimuli generation process.

Generally, it would be reasonable to assume, from a standpoint of coverage, that a uniform distribution of stimuli would be desired. This is because in principle it would not be desired to supply many stimuli of the same value over a certain portion of the coverage range, as same values are typically bound to interact in the same manner with the DUT and yield the same output.

Previously, manual intervention by a user was needed to facilitate obtaining stimuli in ranges that were not originally covered by the generator. An automated approach is now introduced, according to some embodiments of the present invention.

According to some embodiments of the present invention, it is suggested to impose on the stimuli generator a distribution directive that becomes a part of the generation model and acts as a soft constraint, so as to influence the distribution of the generated stimuli towards a desired distribution goal.

A stimuli generator, according to some embodiments of the present invention, receives from the user a generation model (e.g., a constraint model or other model) and a coverage model. A coverage item or items of the coverage model are automatically identified, and a corresponding element or elements are found in the generation model. "Coverage item" means an entity in the coverage model (a data item, e.g., a variables, etc.) and "corresponding element" in the generation model is the corresponding entity in that model (e.g., the same variable or another variable whose relation to the coverage item is known, or may be determined). In its simplest form, the cover item and connected component are simply the same designated field (e.g., the same variable), that is, the coverage item is defined using the generative field of the type being generated, such as, for example structs such as DUT configurations, and run-time traffic data structs.

In more complex scenarios, there would be two different fields, whose relation is known or may be determined (e.g., another variable in the generation model whose relation to the variable in the coverage model is known). Once such relation is determined, the generator translates the coverage requirement relating to the coverage item into a distribution directive.

Then, the generator solves the generation model. A solver may be employed that is designed to solve the generation model with the coverage model. The solver solves the constraint model with the imposed distribution directive of the coverage model applied on the corresponding element or elements, to generate a set of stimuli. The distribution directive does not act as a real constraint, rather more like a tuner for the solver/generator towards coverage goals.

The following example demonstrates this.

According to some embodiments, a stimuli generator reads a coverage model and extracts the distribution that is substantially optimal for fast filling of the coverage space. This technique may be applied to run-time generations and generation of the test environment. (e.g., 'sys' in 'e' language)

As a result, each stimulus generation has higher chances of hitting coverage voids, and fewer generations or simulations may be required to fulfil this task.

As an example, consider a distribution directive that aims at assigning subranges within a stimuli range (e.g., a range of values). A user may provide a distribution directive that includes subranges of a specific range, which are to be covered by the generated stimuli (in other words, that it is desired to have stimuli of values, or other type of data items, within each of these subranges). For example, if the range of the desired values for stimuli is from 0 to 1,000,000, then the user may provide subrange selections, such as, 0-10, 10-20, 20-100, 100-500, 500-10,000 and 10,000-1,000,000, or any other subrange selection.

Furthermore, the user may assign each subrange selection with a desired weight. For example, considering the subranges above, the user may assign subrange 0-10, 10-20, 20-100 with greater weight or weights than the remaining subranges (100-500, 500-10,000 and 10,000-1,000,000), so that the stimuli generator is inclined to generate more stimuli in the first subranges than in the latter subranges. In this example, the generator may take numerous generation before it hits any of the latter subranges (this is just an example, and other subranges and/or subranges may be selected).

Consider the following distribution directive, which may be applied to a stimuli generator:

```
data_phase_duration:uint;
cover pkt_gen_e is {
   item  data_phase_duration using
       text = "Burst data phase duration",
       ranges = {
           range([0..0],"BIN_0__0");
           range([1..1],"BIN_1__1");
           range([2..2],"BIN_2__2");
           range([3..3],"BIN_3__3");
           range([4..4],"BIN_4__4");
           range([5..5],"BIN_5__5");
           range([6..10],"BIN_6__10");
           range([11..32'd4294967295],"BIN_MORE");
};
```

For example, consider the following coverage definition of item "data_phase_duration". The ranges of this item define a separate bin for each of the values 0-5, another bin for 6-10, and another bin for the rest. In this example, it could take numerous generations to hit any of the 7 first bins.

A simplified way to look at the feature is as translating the subranges (bins) to "soft . . . select" buckets, for example, like this:

```
keep soft data_phase_duration = = select {
    1:[0..0];
    ....
    1: [11..32'd4294967295];
}.
```

(Note that this is a highly abstracted view, as the feature considers many items, crosses and constraints at the same time.)

By implementing the coverage model into the generation model, according to some embodiments of the present invention, considerably fewer generations may be needed for a constraint solver to cover all desired items, than it was previously needed (before introducing the method according to the present invention).

Another example relates to items that are not to be included in the coverage goals:

```
data_phase_duration:uint;
cover pkt_gen_e is {
   item  data_phase_duration using
       text = "Burst data phase duration",
       ignore = (data_phase_duration>11)
};
```

In this example the stimuli generator targets "data_phase_duration" to be in the range of [0 . . . 11], whereas targets of values of 12 or greater are to be ignored.

It is noted that fulfilling the distribution directive, according to some embodiments of the present invention, is not necessarily guaranteed, as other constraints, items or crosses may require values greater than 11 in order for them to be satisfied.

Figure 2:
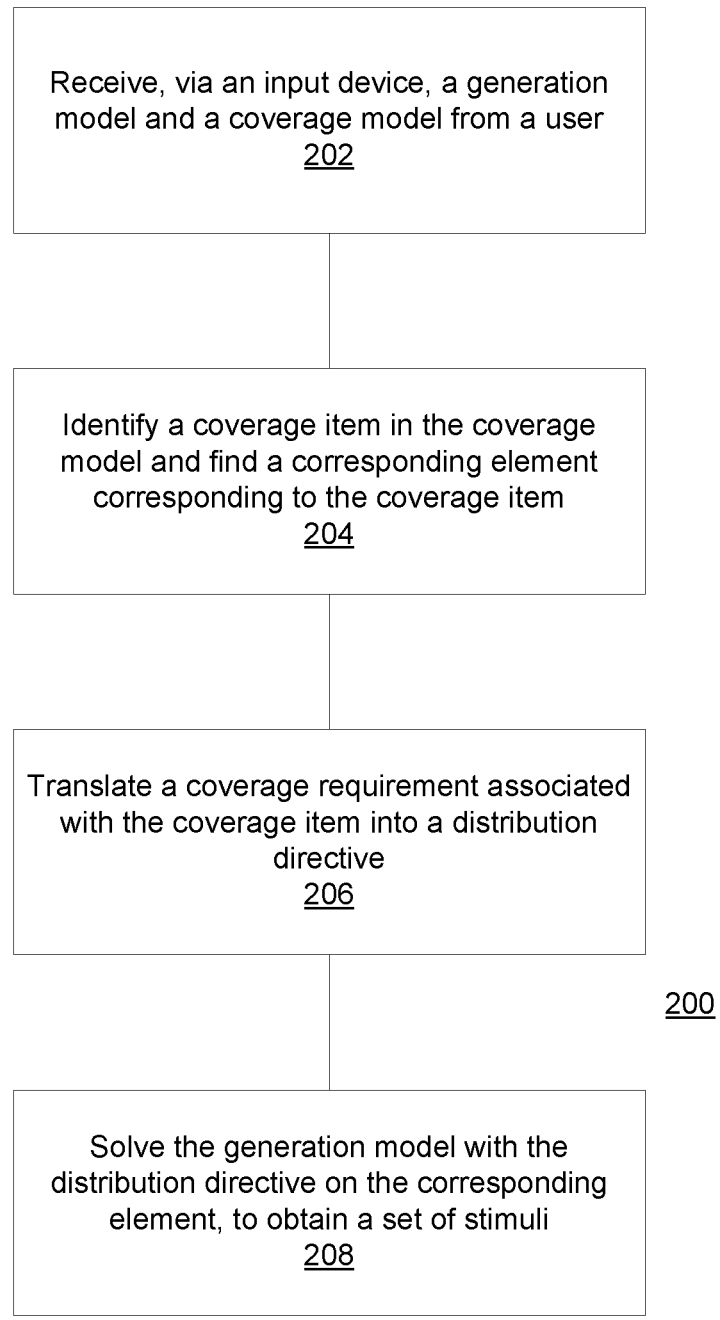
FIG. 2 illustrates a method 200 for coverage driven generation of stimuli for DUT verification.

FIG. 2 illustrates a method 200 for coverage driven generation of stimuli for DUT verification. The method 200 may include receiving 202, via an input device, a generation model and a coverage model from a user. Method 200 may also include using a processor, identifying 204 a coverage item in the coverage model and finding a corresponding element in the generation model corresponding to the coverage item. Method 200 may further include, using a processor, translating 206 a coverage requirement associated with the coverage item into a distribution directive. Method 200 may also include, using a processor, solving 208 the generation model with the distribution directive on the corresponding element, to obtain a set of stimuli.

In some embodiments, the generation model comprises a constraint model. The coverage model may, in some embodiments, be defined based on desired input values for the DUT. In some embodiments, the coverage model may be defined based on anticipated output values from the DUT.

According to some embodiments, the coverage item is a variable.

In some embodiments, finding the corresponding element comprises identifying a field in the coverage model that relates to a field associated with the coverage item in a known relation. In some embodiments, finding the corresponding element comprises identifying a field in the coverage model that is same as a field associated with the coverage item.

Figure 3:
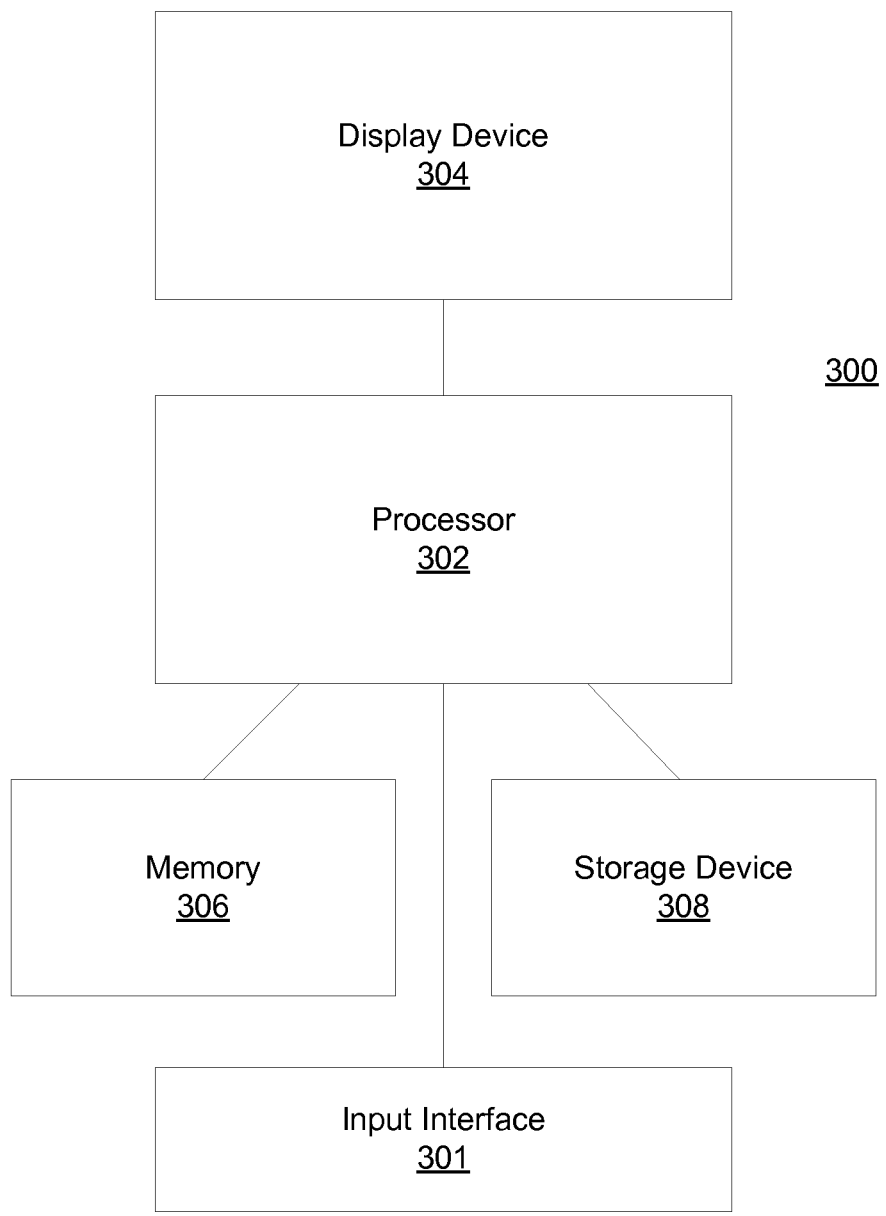
FIG. 3 illustrates a system 300 for coverage driven generation of stimuli for DUT verification, according to some embodiments of the present invention.

FIG. 3 illustrates a system 300 for coverage driven generation of stimuli for DUT verification, according to some embodiments of the present invention.

System 300 may include a processing unit 302 (e.g., one or a plurality of processors, on a single machine or distributed on a plurality of machines) for executing a method according to some embodiments of the present invention.

System 300 may include an input interface 301 for receiving data and instructions from a user, such as, for example, one or a plurality of keyboards, pointing devices, touch sensitive surfaces (e.g., touch sensitive screens), etc. for allowing a user to input commands and data. Processing unit 302 may be linked with memory 306 on which a program implementing a method according to some embodiments of the present invention and corresponding data may be loaded and run from and data may be saved, and storage device 308, which includes a non-transitory computer readable medium (or mediums) such as, for example, one or a plurality of hard disks, flash memory devices, etc. on which a program implementing a method according to some embodiments of the present invention and corresponding data may be stored. System 300 may further include an output device 304 (e.g., display device such as CRT, LCD, LED etc.) on which one or a plurality user interfaces associated with a program implementing a method according to some embodiments and corresponding data may be presented.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples, the instructions stored on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method for coverage driven generation of stimuli for verification of a device-under-test (DUT), the method comprising:
   receiving from a user, via an input device, i) a constraint model with one or more entities for generating a set of random stimuli for input to the DUT and ii) a coverage model with one or more coverage items defining a coverage space for verification of the DUT;
   using a processor, identifying a coverage item from the one or more coverage items in the received coverage model and finding a corresponding entity from the one or more entities in the received constraint model corresponding to the identified coverage item;
   using a processor, translating a coverage requirement related to the identified coverage item into a distribution directive for influencing a distribution in the set of random stimuli;
   wherein the distribution directive includes subranges of ranges that are covered by the generated random stimuli and weights assigned to the subranges;
   using a processor, solving the constraint model with the distribution directive on the corresponding entity, to obtain the set of random stimuli with the distribution tuned over the weighted subranges for fast filling the coverage space; and
   using a processor, applying the set of random stimuli with the tuned distribution to the input of the DUT for verification of the DUT.

2. The method of claim 1, wherein the coverage model is defined based on desired input values for the DUT.

3. The method of claim 1, wherein the coverage model is defined based on anticipated output values from the DUT.

4. The method of claim 1, wherein the coverage item is a variable.

5. The method of claim 1, wherein finding the corresponding entity comprises identifying a field in the coverage model that relates to a field associated with the coverage item in a known relation.

6. The method of claim 1, wherein finding the corresponding entity comprises identifying a field in the coverage model that is same as a field associated with the coverage item.

7. A non-transitory computer readable storage medium for coverage driven generation of stimuli for verification of a device-under-test (DUT), having stored thereon instructions that when executed by a processor will cause the processor to:
   receive from a user, via an input device, i) a constraint model with one or more entities for generating a set of random stimuli for input to the DUT and ii) a coverage model with one or more coverage items defined a coverage space for verification of the DUT;
   identify a coverage item from the one or more coverage items in the received coverage model and find a corresponding entity from the one or more entities in the received constraint model corresponding to the identified coverage item;
   translate a coverage requirement related to the identified coverage item into a distribution directive for influencing a distribution in the set of random stimuli;

wherein the distribution directive includes subranges of ranges that are covered by the generated random stimuli and weights assigned to the subranges;

solve the constraint model with the distribution directive on the corresponding entity, to obtain the set of random stimuli with the distribution tuned over the weighted subranges for fast filling the coverage space; and apply the set of random stimuli with the tuned distribution to the input of the DUT for verification of the DUT.

8. The non-transitory computer readable storage medium of claim 7, wherein the coverage model is defined based on desired input values for the DUT.

9. The non-transitory computer readable storage medium of claim 7, wherein the coverage model is defined based on anticipated output values from the DUT.

10. The non-transitory computer readable storage medium of claim 7, wherein the coverage item is a variable.

11. The non-transitory computer readable storage medium of claim 7, wherein finding the corresponding entity comprises identifying a field in the coverage model that relates to a field associated with the coverage item in a known relation.

12. The non-transitory computer readable storage medium of claim 7, wherein finding the corresponding entity comprises identifying a field in the coverage model that is same as a field associated with the coverage item.

13. A system for coverage driven generation of stimuli for verification of a device-under-test (DUT), the system comprising:

a processor and a memory, the processor configured to:
receive from a user, via an input device, i) a constraint model with one or more entities for generating a set of random stimuli for input to the DUT and ii) a coverage model with one or more coverage items defining a coverage space for verification of the DUT;

identify a coverage item from the one or more coverage items in the received coverage model and find a corresponding entity from the one or more entities in the received constraint model corresponding to the identified coverage item;

translate a coverage requirement related to the identified coverage item into a distribution directive for influencing a distribution in the set of random stimuli;

wherein the distribution directive includes subranges of ranges that are covered by the generated random stimuli and weights assigned to the subranges;

solve the constraint model with the distribution directive on the corresponding entity, to obtain the set of random stimuli with the distribution tuned over the weighted subranges for fast filling the coverage space; and apply the set of random stimuli with the tuned distribution to the input of the DUT for verification of the DUT.

14. The system of claim 13, wherein the coverage model is defined based on desired input values for the DUT.

15. The system of claim 13, wherein the coverage model is defined based on anticipated output values from the DUT.

16. The system of claim 13, wherein the coverage item is a variable.

17. The system of claim 13, wherein finding the corresponding entity comprises identifying a field in the coverage model that relates to a field associated with the coverage item in a known relation.

* * * * *